US012083718B2

United States Patent
Song et al.

(10) Patent No.: US 12,083,718 B2
(45) Date of Patent: Sep. 10, 2024

(54) PREPARATION METHOD OF HIGH-RATE FOAMED POLYLACTIC ACID (PLA) SHEET

(71) Applicant: JHM Engineering and Technology (Ningbo) Co., Ltd, Ningbo (CN)

(72) Inventors: Yanan Song, Ningbo (CN); Lejun Wang, Beijing (CN); Weiwei Huang, Ningbo (CN); Zongqiang Zheng, Ningbo (CN); Yining Liu, Beijing (CN)

(73) Assignee: JHM Engineering and Technology (Ningbo) Co., Ltd, Ningbo (CN)

( * ) Notice: Subject to any disclaimer, the term of this patent is extended or adjusted under 35 U.S.C. 154(b) by 465 days.

(21) Appl. No.: 17/419,308

(22) PCT Filed: Jul. 18, 2019

(86) PCT No.: PCT/CN2019/096496
§ 371 (c)(1),
(2) Date: Jun. 29, 2021

(87) PCT Pub. No.: WO2020/134041
PCT Pub. Date: Jul. 2, 2020

(65) Prior Publication Data
US 2022/0088840 A1 Mar. 24, 2022

(30) Foreign Application Priority Data

Dec. 29, 2018 (CN) .......................... 201811637504.9

(51) Int. Cl.
*B29C 48/07* (2019.01)
*B29C 44/08* (2006.01)
*B29C 44/34* (2006.01)
*B29C 44/50* (2006.01)
*B29C 44/56* (2006.01)
*B29C 48/00* (2019.01)
*B29C 48/14* (2019.01)
*B29C 48/38* (2019.01)
*B29C 48/88* (2019.01)
(Continued)

(52) U.S. Cl.
CPC .......... *B29C 44/08* (2013.01); *B29C 44/3415* (2013.01); *B29C 44/50* (2013.01);
(Continued)

(58) Field of Classification Search
CPC ..... B29C 44/08; B29C 44/3415; B29C 44/50; B29C 44/5672; B29C 48/0012;
(Continued)

(56) References Cited

U.S. PATENT DOCUMENTS

2007/0141286 A1    6/2007  Takase et al.
2007/0293593 A1*  12/2007  Harfmann ................. C08J 9/12
                                                            521/79
(Continued)

FOREIGN PATENT DOCUMENTS

CN        1058221 A        1/1992
CN        1600814 A        3/2005
(Continued)

OTHER PUBLICATIONS

Notice of the General Office of the State Council on Restricting the Production, Sale and Use of Plastic Shopping Bags, 2008, No. 72, General Office of the State Council of the People's Republic of China.
(Continued)

*Primary Examiner* — Nahida Sultana
(74) *Attorney, Agent, or Firm* — Bayramoglu Law Offices LLC

(57) ABSTRACT

A preparation method of a high-rate foamed polylactic acid (PLA) sheet includes first-stage extrusion, second-stage extrusion, and foamed sheet extrusion. The method requires the following raw materials in parts by mass: 88 to 94 parts of PLA, 1 to 2 parts of a nucleating agent, 2 to 5 parts of a foaming agent, and 2 to 5 parts of an additive. The new method effectively solves the problems of low foaming rate, low strength, and the like in the industrial production using carbon dioxide, and a prepared PLA sheet with high foaming
(Continued)

rate and excellent surface performance can be used in the fields of food packaging, disposable fully-degradable lunch boxes, and the like.

9 Claims, 1 Drawing Sheet

(51) Int. Cl.
| | | |
|---|---|---|
| *B29C 48/92* | (2019.01) | |
| *C08J 9/00* | (2006.01) | |
| *C08J 9/14* | (2006.01) | |
| *C08K 3/34* | (2006.01) | |
| *B29K 67/00* | (2006.01) | |

(52) U.S. Cl.
CPC ...... *B29C 44/5672* (2013.01); *B29C 48/0012* (2019.02); *B29C 48/07* (2019.02); *B29C 48/144* (2019.02); *B29C 48/38* (2019.02); *B29C 48/9135* (2019.02); *B29C 48/92* (2019.02); *C08J 9/0066* (2013.01); *C08J 9/148* (2013.01); *C08K 3/34* (2013.01); *B29K 2067/046* (2013.01); *C08J 2201/03* (2013.01); *C08J 2367/04* (2013.01)

(58) Field of Classification Search
CPC ..... B29C 48/07; B29C 48/38; B29C 48/9135; B29C 48/92; C08J 9/0066; C08J 9/148
See application file for complete search history.

(56) References Cited

U.S. PATENT DOCUMENTS

| | | | | |
|---|---|---|---|---|
| 2008/0146686 | A1* | 6/2008 | Handa | C08J 9/142 |
| | | | | 521/58 |
| 2010/0086758 | A1* | 4/2010 | Takase | C08J 9/141 |
| | | | | 428/219 |
| 2021/0331442 | A1* | 10/2021 | Lu | B32B 5/32 |
| 2023/0242730 | A1* | 8/2023 | Miki | C08J 9/0066 |
| | | | | 428/220 |

FOREIGN PATENT DOCUMENTS

| | | | |
|---|---|---|---|
| CN | 101959945 | A | 1/2011 |
| CN | 102037053 | A | 4/2011 |
| CN | 102573818 | A | 7/2012 |
| CN | 103467949 | A | 12/2013 |
| CN | 105038161 | A | 11/2015 |
| CN | 105916925 | A | 8/2016 |
| CN | 106750486 | A | 5/2017 |
| CN | 106905676 | A | 6/2017 |
| CN | 106967280 | A | 7/2017 |
| CN | 107337912 | A | 11/2017 |
| CN | 108409985 | A | 8/2018 |
| CN | 108752734 | A | 11/2018 |
| CN | 108948698 | A | 12/2018 |
| CN | 109593332 | A | 4/2019 |
| CN | 109762313 | A | 5/2019 |
| CN | 109776848 | A | 5/2019 |
| CN | 109852037 | A | 6/2019 |
| JP | 2001253964 | | 9/2001 |
| KR | 20150139114 | A | 12/2015 |
| WO | 2005042627 | A1 | 5/2005 |

OTHER PUBLICATIONS

Zhang Jianqun, et al., Research on the Production Technology of PLA PLA Physical Foam Sheet, pp. 1-4.

GB/T16606.1, Packings for express service—Part 1: Envelope, 2018, pp. 1-8, The General Administration of Quality Supervision, Inspection and Quarantine of the People's Republic of China and the Standardization Administration of the People's Republic of China.

GB/T16606.2, Packings for express service—Part 2: Packing box, 2018, pp. 1-10, The General Administration of Quality Supervision, Inspection and Quarantine of the People's Republic of China and the Standardization Administration of the People's Republic of China.

* cited by examiner

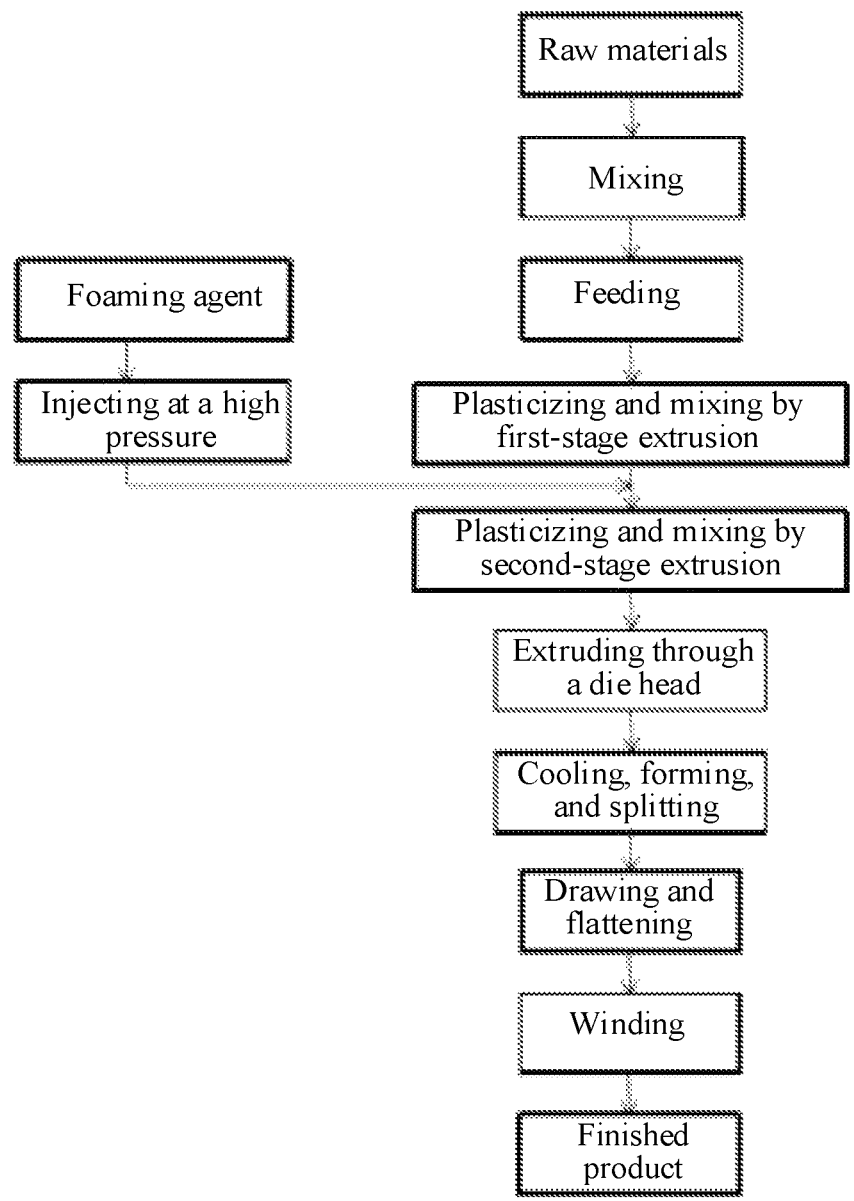

PREPARATION METHOD OF HIGH-RATE FOAMED POLYLACTIC ACID (PLA) SHEET

CROSS REFERENCE TO THE RELATED APPLICATIONS

This application is the national phase entry of International Application No. PCT/CN2019/096496, filed on Jul. 18, 2019, which is based upon and claims priority to Chinese Patent Application No. 201811637504.9, filed on Dec. 29, 2018, the entire contents of which are incorporated herein by reference.

TECHNICAL FIELD

The present disclosure belongs to the technical field of polylactic acid (PLA) foaming, and specifically relates to a preparation method of a high-rate foamed PLA sheet.

BACKGROUND

Due to the explosive growth of the express delivery industry and the pollution caused by packaging waste produced in the express delivery industry in recent years, the State Post Bureau of the People's Republic of China issued the "Implementation Plan for Promoting Green Packaging in Express Delivery Industry" in 2016. The General Administration of Quality Supervision, Inspection and Quarantine of the People's Republic of China and the Standardization Administration of the People's Republic of China issued a series of national standards "Express Packaging Supplies" in February 2018. These regulations and standards provide new requirements on express packaging reduction according to the requirements of reduction, environmental friendliness, and recyclability, namely, express packaging bags should be made of biodegradable plastics to reduce white pollution. In 2018 (10 years after the "Notice of the General Office of the State Council on Restricting the Production, Sale and Use of Plastic Shopping Bags" was issued), a special column "Advice and Suggestions on the Prevention and Control of Plastic Waste Pollution" is set on the National Development and Reform Commission's website to invite people from all walks of life to provide suggestions for regulations of plastic products in different fields from January 5 to January 31. This is a measure further taken nationally to prevent and control "white pollution" since the implementation of the "Notice of the General Office of the State Council on Restricting the Production, Sale and Use of Plastic Shopping Bags" in 2008. Online food ordering platforms mainly including Meituan and Ele.me started to promote green disposable tableware under social pressure. On Feb. 28, 2018, Cainiao Network Technology Co., Ltd. worked together with Alibaba Foundation, China Environmental Protection Foundation, and major express companies such as ZTO Express, YTO Express, STO Express, TTK Express, BEST Express, and Yunda Express to release the "Funding Program for Research and Development on China Green Logistics", which is expected to facilitate the industry upgrade with the help of the science and technology, thus making the logistics service in China greener, smarter, and more efficient.

PLA is a fully-biodegradable material derived from renewable resources. The raw material of PLA is prepared by fermenting plants with high sugar content such as cassava, corn, and sugar beet, the raw material is subjected to polycondensation to form lactide, and then the lactide is subjected to ring-opening polymerization (ROP) to obtain PLA. PLA can be processed by injection molding, blister molding, bottle blowing, film blowing, spinning, and the like. The discarded products made of PLA can be decomposed into carbon dioxide and water under the action of microorganisms, water, and oxygen in soil, which is conducive to plant growth. There is no excess carbon dioxide emission throughout the life cycle of PLA, so PLA is truly a low-carbon and eco-friendly material. Further, with no toxic and side effect and no release of harmful substances, PLA is an ideal packaging material and safe food contact material.

At present, the popularization of PLA is mainly restricted by performance and price. However, if PLA is made into a foamed material, the cost thereof can be greatly reduced to have competitive pricing over the common polypropylene (PP) material on the market, resulting in an obvious competitive advantage. The foamed PLA material has a place in the current plastics market dominated by PP and PS. Due to the increasing scarcity of petroleum source and the increasing environmental damage and environmental pollution caused by traditional petroleum-based plastics, the demand for biodegradable materials, especially for foamed PLA materials, is increasing year by year at home and abroad, which indicates that the foamed PLA materials have great market potential. In recent years, with the continuous advancement of polymer science, the defects of PLA are constantly being overcome. In the future, fully-degradable PLA materials are very promising to completely replace traditional petroleum-based plastics and become the mainstream plastic products on the market.

The Chinese patent CN105038161A discloses modified halloysite, a foamed PLA material, and preparation and use thereof, where halloysite is modified by surface hydroxylation and organosilanization, and the modified halloysite adsorbs carbon dioxide, PLA, and a cross-linking agent to prepare the foamed PLA material, which has a foaming density of 0.038 g/cm$^3$, a foaming rate of more than 30 times, and a cell size of 10 μm to 30 μm. Moreover, the patent also discloses the melt index, melt strength, tensile strength, bending strength, and notched impact strength of the foamed material. Halloysite purification in this patent is relatively complicated, and solvents used are mostly dangerous and harmful to the human body, which goes against the requirements of environmental protection and is not conducive to the industrialization of foamed PLA materials.

The Chinese patent CN106967280A discloses a method for preparing a high-rate fully-biodegradable foamed material, where PLA, a reactive compatibilizer EC, poly(butyleneadipate-co-terephthalate) (PBAT), and organically modified montmorillonite (OMMT) are subjected to closed compounding/mixing to obtain a modified mixed masterbatch, and supercritical carbon dioxide is injected for foaming to obtain a product with a foaming density of 0.0155 g/cm$^3$ to 0.0205 g/cm$^3$ and a foaming rate of 60 to 80. Although an ultrahigh-rate foamed material can be obtained in this patent, the mechanical properties of the material such as tensile strength, bending strength, and notched impact strength are significantly decreased with the increase of the foaming rate, which affects the use of the material in the field of disposable lunch boxes.

The Chinese patent CN106750486A discloses a method for preparing a micro-foamed PLA-based wood-plastic composite (WPC) by a supercritical fluid (SCF), where PLA, wood flour, a toughening agent, a chain extender, a lubricant, and a nucleating agent are mixed, and a resulting mixture is extruded by a twin-screw extruder to obtain a foamed PLA material, which has uniform foam cells, a foaming rate of 5 to 50, an apparent density of 0.03 g/cm³ to 0.3 g/cm³, and a cell diameter of 10 μm to 200 μm. In this patent, the addition of the wood flour results in much different foam cell sizes, which is likely to reduce the glossiness of a surface of a PLA sheet.

The Chinese patent CN108409985A discloses a method for increasing a foaming rate of PLA through pre-isothermal cold crystallization, where a prepared foamed PLA material has a foaming rate up to 17.7, an average foam cell diameter of 18 μm, and a foam cell density of $2.2 \times 10^8/cm^3$. In this patent, it is not easy to control a foaming rate during the foaming in autoclave equipment, so the method cannot prepare a foamed material with a stable rate required by customers.

The foamed PLA material prepared by the foaming gas of carbon dioxide in the prior art has the following shortcomings:
(1) In the case where the mechanical properties of a foamed material are ensured, the foaming rate is low; and in the case where the foaming rate is increased, the tensile strength, bending strength, notched impact strength, and other mechanical properties of a prepared foamed material will be significantly reduced.
(2) It is difficult to control a foaming size and a foaming rate, and a prepared sheet has non-uniform foam cell diameters and non-uniform thicknesses.
(3) A foamed material prepared by the prior art has a low apparent density and a low mechanical strength, and is prone to perforation and bubble-breaking during production.

SUMMARY

In order to solve the deficiencies in the prior art, the present disclosure provides a preparation method of a high-rate foamed PLA sheet, which can be used for industrial production, efficiently produce a fully-degradable foamed PLA sheet meeting market needs, and achieve the following invention objectives:
(1) The present disclosure can improve the tensile strength and the bending strength of a foamed material while increasing a foaming rate.
(2) In the present disclosure, a foaming size and a foaming rate are easily controlled, and a prepared sheet has uniform foam cell diameters and uniform thicknesses.
(3) The present disclosure can improve the apparent density, and a prepared material is subjected to no perforation or bubble-breaking.

To solve the above-mentioned technical problems, the present disclosure adopts the following technical solutions.

The present disclosure provides a preparation method of a high-rate foamed PLA sheet, including the following steps:
(1) First-Stage Extrusion
88 to 95 parts of PLA, 1 to 2 parts of a nucleating agent, 2 to 5 parts of a foaming agent, and 2 to 5 parts of an additive (in parts by mass) are taken and injected into a first-stage screw extruder (a temperature of each zone of the first-stage screw extruder is set as required), and the raw materials and the foaming agent are thoroughly mixed in liquid phases to obtain a preliminary mixed melt.

The PLA raw material may refer to a modified foam-grade PLA raw material with a molecular weight of 120,000 to 150,000 and a PLA content of ≥97%.

The foaming agent may be a fluorine-containing compound in a gaseous state, which may be any one from the group consisting of difluoromonochloromethane, trifluorotrichloroethane, and tetrafluorodichloroethane; the nucleating agent may be a talcum powder; and the additive may be nitrogen.

Since a pressure of the foaming agent (fluorine-containing compound) itself is not enough to achieve thorough blending of the foaming agent with a PLA melt, the additive nitrogen is required. The nitrogen may be high-pressure and high-purity nitrogen with a purity of ≥99.9%, which may be injected at a pressure of 10 MPa to 15 MPa.

The foaming agent may be injected at a pressure of 16 MPa to 20 MPa.

Eleven temperature zones (from a first temperature zone to an eleventh temperature zone) may be set in sequence from a feeder to an extruder neck of the first-stage screw extruder, with a temperature range of 180° C. to 200° C.

The eleven temperature zones set in sequence from a feeder to an extruder neck of the first-stage screw extruder may include: a first temperature zone: 180° C. to 185° C.; a second temperature zone: 182° C. to 188° C.; a third temperature zone: 190° C.; a fourth temperature zone: 195° C.; a fifth temperature zone: 198° C. to 200° C.; a sixth temperature zone: 200° C.; a seventh temperature zone: 200° C.; an eighth temperature zone: 200° C.; a ninth temperature zone: 200° C.; a tenth temperature zone: 200° C.; and an eleventh temperature zone: 200° C.

A screw of the first-stage screw extruder may have a diameter of 135 mm, a length-to-diameter ratio of 36:1, and an initial speed of 5 r/min to 15 r/min.

(2) Second-Stage Extrusion
The preliminary mixed melt is injected into a second-stage screw extruder and a mold temperature controller is used for second-stage temperature-controlled mixing. A temperature of each zone of the mold temperature controller is set to allow the mixed melt to be further melted, mixed, pressurized, and cooled, such that the melt has an ideal state for sheet production.

Eight temperature control units may be set in sequence from a melt entrance of the second-stage screw extruder to a die head of the second-stage screw extruder, with a temperature range of 150° C. to 170° C.; a melt pressure may be controlled at 4 MPa to 6 MPa; and a screw of the second-stage screw extruder may have a diameter of 150 mm, a length-to-diameter ratio of 36:1, and an initial speed of 5 r/min to 7 r/min.

The eight temperature control units set in sequence from a melt entrance of the second-stage screw extruder to a die head of the second-stage screw extruder may include: temperature control unit 1: 165° C. to 180° C.; temperature control unit 2: 160° C. to 168° C.; temperature control unit 3: 158° C. to 165° C.; temperature control unit 4: 156° C. to 163° C.; temperature control unit 5: 152° C. to 160° C.; temperature control unit 6: 153° C. to 158° C.; temperature control unit 7: 152° C. to 155° C.; and temperature control unit 8: 152° C. to 155° C.

(3) Foamed Sheet Extrusion
After a melt at an outlet of the first-stage extrusion has a pressure of 12 Mpa to 15 Mpa and a temperature of 190° C. to 200° C. and a melt at an outlet of the second-stage extrusion has a pressure of 3 MPa to 6 MPa and a temperature of 150° C. to 160° C., a speed of the first-stage extruder may be set to 20 r/min to 50 r/min and preferably to 20 r/min to 30 r/min and a speed of the second-stage extruder is set to 10 r/min to 20 r/min to extrude a foamed sheet through a sheet die.

(4) Cool Molding, Splitting, Flattening, Drawing, Shaping and Winding
An extrusion product is cooled and formed by a cool molding device, then split and flattened, then cooled and drawn by a drawing machine, and shaped and wound by a winding machine to finally obtain a foamed PLA sheet.

The cool molding device may be an anti-static cool molding sleeve, and a formed sheet may be subjected to annular cooling using two cooling fans and to water-cooling in a forming sleeve. The drawing machine may be a roller drawing machine, with a drawing speed of 8 m/min to 12 m/min.

The present disclosure adopts a two-stage tandem single-screw extrusion system, which includes a first-stage screw extruder and a second-stage screw extruder.

Beneficial Effects of the Present Disclosure:

The present disclosure adopts a fluorine-containing compound as a physical foaming agent (in combination with nitrogen as an additive) and a two-stage screw extrusion process to achieve the following beneficial effects:

(1) The PLA sheet prepared by the present disclosure has a foaming rate of 13 to 16, the tensile strength of 80 Mpa to 88 Mpa, and the bending strength of 120 Mpa to 128 Mpa.

(2) The foamed PLA material prepared by the present disclosure has uniform foam cell diameters and uniform sheet thicknesses. The sheet has a thickness of 2 mm to 5 mm and preferably of 3.8 mm to 4.8 mm (which is uniform, with an error controlled within ±0.1 mm), a foam cell diameter of 10 μm to 40 μm, and a cell density of $1 \times 10^8$ to $2.7 \times 10^8/cm^3$.

(3) The foamed PLA material prepared by the present disclosure has an apparent density of 0.06 $g/cm^3$ to 0.18 $g/cm^3$ and preferably of 0.075 $g/cm^3$ to 0.092 $g/cm^3$, which is subjected to no perforation or bubble-breaking and has a stable sheet cellular structure.

(4) The 135/150 two-stage tandem single-screw extrusion system used in the present disclosure is an optimization design of special screw CAD design software according to the physical foaming characteristics of a polymer, which is equipped with an automatic hydraulic screen changer and can achieve low-temperature stable extrusion with high plasticization capacity. The equipment system can efficiently and stably produce a foamed sheet with a width of 1,080 mm, and can realize the industrial production of foamed PLA.

BRIEF DESCRIPTION OF THE DRAWING

FIGURE is a flow chart of the process for preparing a high-rate foamed PLA sheet according to the present disclosure.

DETAILED DESCRIPTION OF THE EMBODIMENTS

The present disclosure is further described below with reference to examples.

Example 1

(1) First-Stage Extrusion

In parts by mass, 88 parts of PLA and 2 parts of a talcum powder (as a nucleating agent) were injected into a first-stage screw extruder, and after the materials were plasticized and mixed in the first-stage extruder, 5 parts of difluoromonochloromethane (as a foaming agent) and 5 parts of nitrogen (as an additive) were injected into the first-stage extruder, where the foaming agent was injected at a pressure of 18 Mpa and the nitrogen was injected at a pressure of 11 Mpa. Eleven temperature zones were set in sequence from a feeder to an extruder neck of the first-stage screw extruder as follows: a first temperature zone: 180° C.; a second temperature zone: 182° C.; a third temperature zone: 190° C.; a fourth temperature zone: 195° C.; a fifth temperature zone: 200° C.; a sixth temperature zone: 200° C.; a seventh temperature zone: 200° C.; an eighth temperature zone: 200° C.; a ninth temperature zone: 200° C.; a tenth temperature zone: 200° C.; and an eleventh temperature zone: 200° C. An extrusion speed of the first-stage screw extruder was set to 10 r/min. After the raw materials and the foaming agent were thoroughly mixed in liquid phases, a preliminary mixed melt was obtained.

(2) Second-Stage Extrusion

The preliminary mixed melt was injected into a two-stage screw extruder and a mold temperature controller was used for second-stage temperature-controlled mixing, where a melt pressure was controlled at 4 Mpa to 6 Mpa. Eight temperature control units were set in sequence from a melt entrance of the second-stage screw extruder to a die head as follows: temperature control unit 1: 165° C.; temperature control unit 2: 160° C.; temperature control unit 3: 158° C.; temperature control unit 4: 158° C.; temperature control unit 5: 152° C.; temperature control unit 6: 153° C.; temperature control unit 7: 153° C.; and temperature control unit 8: 153° C. A speed of the two-stage screw extruder was set to 5 r/min.

The mixed melt was further melted, mixed, pressurized, and cooled.

(3) Foamed Sheet Extrusion

After a melt at an outlet of the first-stage extrusion had a pressure of 15 Mpa and a temperature of 190° C. and a melt at an outlet of the second-stage extrusion had a pressure of 4 MPa and a temperature of 150° C., a speed of the first-stage extruder was set to 24 r/min and a speed of the second-stage extruder was set to 13 r/min, an inner die bolt and an outer die bolt were adjusted such that there was a distance of 1.5 mm between the dies, and a foamed sheet was extruded from the melt through a barrel-shaped sheet die.

(4) Cool Molding, Splitting, Flattening, Drawing, Shaping and Winding

An extrusion product was cooled and formed by a cool molding device, then split and flattened, then cooled and drawn by a drawing machine at a drawing speed of 8 m/min, and shaped and wound by a winding machine to finally obtain a foamed PLA sheet.

The obtained foamed sheet had a width of 1 m, a thickness of 4.8 mm, an apparent density of 0.075 $g/cm^3$, a foaming rate of 16, a foam cell diameter of 30 μm to 40 μm, a cell density of $1 \times 10^8/cm^3$, tensile strength of 80 Mpa, and bending strength of 128 Mpa.

Example 2

(1) First-Stage Extrusion

In parts by mass, 90 parts of PLA and 2 parts of a talcum powder (as a nucleating agent) were injected into a first-stage screw extruder, and after the materials were plasticized and mixed in the first-stage extruder, 4 parts of trifluorotrichloroethane (as a foaming agent) and 4 parts of nitrogen (as an additive) were injected into the first-stage screw extruder, where the foaming agent was injected at a pressure of 18 Mpa and the nitrogen was injected at a pressure of 12 Mpa. Eleven temperature zones were set in sequence from a feeder to an extruder neck of the first-stage screw extruder as follows: a first temperature zone: 182° C.; a second temperature zone: 182° C.; a third temperature zone: 190° C.; a fourth temperature zone: 195° C.; a fifth temperature zone: 200° C.; a sixth temperature zone: 200° C.; a seventh temperature zone: 200° C.; an eighth temperature zone: 200° C.; a ninth temperature zone: 200° C.; a tenth temperature zone: 200° C.; and an eleventh temperature zone: 200° C. An extrusion speed of the first-stage screw extruder was set to 10 r/min. After the raw materials and the foaming agent were thoroughly mixed in liquid phases, a preliminary mixed melt was obtained.

(2) Second-Stage Extrusion

The preliminary mixed melt was injected into a two-stage screw extruder and a mold temperature controller was used for second-stage temperature-controlled mixing, where a melt pressure was controlled at 4 Mpa to 6 Mpa. Eight temperature control units were set in sequence from a melt entrance of the second-stage screw extruder to a die head as follows: temperature control unit 1: 165° C.; temperature control unit 2: 165° C.; temperature control unit 3: 163° C.; temperature control unit 4: 161° C.; temperature control unit 5: 158° C.; temperature control unit 6: 155° C.; temperature control unit 7: 152° C.; and temperature control unit 8: 152° C. A speed of the two-stage screw extruder was set to 5 r/min. The mixed melt was further melted, mixed, pressurized, and cooled.

(3) Foamed Sheet Extrusion

After a melt at an outlet of the first-stage extrusion had a pressure of 15 Mpa and a temperature of 195° C. and a melt at an outlet of the second-stage extrusion had a pressure of 4 MPa and a temperature of 155° C., a speed of the first-stage extruder was set to 24 r/min and a speed of the second-stage extruder was set to 13 r/min, an inner die bolt and an outer die bolt were adjusted such that there was a distance of 1.4 mm between the dies, and a foamed sheet was extruded from the melt through a barrel-shaped sheet die.

(4) Cool Molding, Splitting, Flattening, Drawing, Shaping and Winding

An extrusion product was cooled and formed by a cool molding device, then split and flattened, then cooled and drawn by a drawing machine at a drawing speed of 10 m/min, and shaped and wound by a winding machine to finally obtain a foamed PLA sheet.

The obtained foamed sheet had a width of 1 m, a thickness of 4.2 mm, an apparent density of 0.08 g/cm$^3$, a foaming rate of 15, a foam cell diameter of 25 μm to 40 μm, a cell density of $2\times10^8/cm^3$, tensile strength of 85 Mpa, and bending strength of 120 Mpa.

Example 3

(1) First-Stage Extrusion

In parts by mass, 91 parts of PLA and 2 parts of a talcum powder (as a nucleating agent) were injected into a first-stage screw extruder, and after the materials were plasticized and mixed in the first-stage extruder, 3.5 parts of tetrafluorodichloroethane (as a foaming agent) and 3.5 parts of nitrogen (as an additive) were injected into the first-stage screw extruder, where the foaming agent was injected at a pressure of 18 Mpa and the nitrogen was injected at a pressure of 14 Mpa. Eleven temperature zones were set in sequence from a feeder to an extruder neck of the first-stage screw extruder as follows: a first temperature zone: 185° C.; a second temperature zone: 188° C.; a third temperature zone: 190° C.; a fourth temperature zone: 195° C.; a fifth temperature zone: 200° C.; a sixth temperature zone: 200° C.; a seventh temperature zone: 200° C.; an eighth temperature zone: 200° C.; a ninth temperature zone: 200° C.; a tenth temperature zone: 200° C.; and an eleventh temperature zone: 200° C. An extrusion speed of the first-stage screw extruder was set to 10 r/min. After the raw materials and the foaming agent were thoroughly mixed in liquid phases, a preliminary mixed melt was obtained.

(2) Second-Stage Extrusion

The preliminary mixed melt was injected into a two-stage screw extruder and a mold temperature controller was used for second-stage temperature-controlled mixing, where a melt pressure was controlled at 4 Mpa to 6 Mpa. Eight temperature control units were set in sequence from a melt entrance of the second-stage screw extruder to a die head as follows: temperature control unit 1: 165° C.; temperature control unit 2: 160° C.; temperature control unit 3: 158° C.; temperature control unit 4: 156° C.; temperature control unit 5: 154° C.; temperature control unit 6: 153° C.; temperature control unit 7: 153° C.; and temperature control unit 8: 153° C. A speed of the two-stage screw extruder was set to 5 r/min. The mixed melt was further melted, mixed, pressurized, and cooled.

(3) Foamed Sheet Extrusion

After a melt at an outlet of the first-stage extrusion had a pressure of 17 Mpa and a temperature of 192° C. and a melt at an outlet of the second-stage extrusion had a pressure of 5 MPa and a temperature of 160° C., a speed of the first-stage extruder was set to 24 r/min and a speed of the second-stage extruder was set to 13 r/min, an inner die bolt and an outer die bolt were adjusted such that there was a distance of 1.4 mm between the dies, and a foamed sheet was extruded from the melt through a barrel-shaped sheet die.

(4) Cool Molding, Splitting, Flattening, Drawing, Shaping and Winding

An extrusion product was cooled and formed by a cool molding device, then split and flattened, then cooled and drawn by a drawing machine at a drawing speed of 10 m/min, and shaped and wound by a winding machine to finally obtain a foamed PLA sheet.

The obtained foamed sheet had a width of 1 m, a thickness of 4.0 mm, an apparent density of 0.086 g/cm$^3$, a foaming rate of 14, a foam cell diameter of 10 μm to 30 μm, a cell density of $2.4\times10^8/cm^3$, tensile strength of 86 Mpa, and bending strength of 122 Mpa.

Example 4

(1) First-Stage Extrusion

In parts by mass, 92 parts of PLA and 2 parts of a talcum powder (as a nucleating agent) were injected into a first-stage screw extruder, and after the materials were plasticized and mixed in the first-stage extruder, 3 parts of difluoromonochloromethane (as a foaming agent) and 3 parts of nitrogen (as an additive) were injected into the first-stage screw extruder, where the foaming agent was injected at a pressure of 18 Mpa and the nitrogen was injected at a pressure of 15 Mpa. Eleven temperature zones were set in sequence from a feeder to an extruder neck of the first-stage screw extruder as follows: a first temperature zone: 182° C.; a second temperature zone: 186° C.; a third temperature zone: 190° C.; a fourth temperature zone: 195° C.; a fifth temperature zone: 198° C.; a sixth temperature zone: 200° C.; a seventh temperature zone: 200° C.; an eighth temperature zone: 200° C.; a ninth temperature zone: 200° C.; a tenth temperature zone: 200° C.; and an eleventh temperature zone: 200° C. An extrusion speed of the first-stage screw extruder was set to 10 r/min. After the raw materials and the foaming agent were thoroughly mixed in liquid phases, a preliminary mixed melt was obtained.

(2) Second-Stage Extrusion

The preliminary mixed melt was injected into a two-stage screw extruder and a mold temperature controller was used for second-stage temperature-controlled mixing, where a melt pressure was controlled at 4 Mpa to 6 Mpa. Eight temperature control units were set in sequence from a melt entrance of the second-stage screw extruder to a die head as follows: temperature control unit 1: 180° C.; temperature control unit 2: 168° C.; temperature control unit 3: 165° C.; temperature control unit 4: 163° C.; temperature control unit 5: 160° C.; temperature control unit 6: 158° C.; temperature control unit 7: 155° C.; and temperature control unit 8: 155° C. A speed of the two-stage screw extruder was set to 5 r/min. The mixed melt was further melted, mixed, pressurized, and cooled.

(3) Foamed Sheet Extrusion

After a melt at an outlet of the first-stage extrusion had a pressure of 18 Mpa and a temperature of 198° C. and a melt at an outlet of the second-stage extrusion had a pressure of 6 MPa and a temperature of 153° C., a speed of the first-stage extruder was set to 24 r/min and a speed of the second-stage extruder was set to 13 r/min, an inner die bolt and an outer die bolt were adjusted such that there was a distance of 1.3 mm between the dies, and a foamed sheet was extruded from the melt through a barrel-shaped sheet die.

(4) Cool Molding, Splitting, Flattening, Drawing, Shaping and Winding

An extrusion product was cooled and formed by a cool molding device, then split and flattened, then cooled and drawn by a drawing machine at a drawing speed of 10.5 m/min, and shaped and wound by a winding machine to finally obtain a foamed PLA sheet.

The obtained foamed sheet had a width of 1 m, a thickness of 3.8 mm, an apparent density of about 0.092 g/cm$^3$, a foaming rate of 13, a foam cell diameter of 20 μm to 30 μm, a cell density of 2.7×10$^8$/cm$^3$, tensile strength of 88 Mpa, and bending strength of 128 Mpa.

In the technical solutions of the present disclosure, a fluoride is adopted as a foaming agent, which can be well blended with a PLA melt; and a two-stage tandem single-screw extrusion system is adopted, where in first-stage extrusion, a PLA raw material is rapidly heated by electrical heating, and in second-stage extrusion, 8 temperature control units are set to achieve precise temperature control with fixed set-point, such that the PLA melt and the foaming agent can be well blended.

What is claimed is:

1. A preparation method of a high-rate foamed polylactic acid (PLA) sheet, comprising first-stage extrusion, second-stage extrusion, and foamed sheet extrusion, wherein the first-stage extrusion is conducted with the following raw materials in parts by mass: 88 to 95 parts of PLA, 1 to 2 parts of a nucleating agent, 2 to 5 parts of a foaming agent, and 2 to 5 parts of an additive; and the foaming agent is a fluorine-containing compound, wherein the foaming agent is any one from the group consisting of difluoromonochloromethane, trifluorotrichloroethane, and tetrafluorodichloroethane, and wherein the high-rate foamed PLA sheet has a foaming rate of 13 to 16, a tensile strength of 80 Mpa to 88 Mpa, and a bending strength of 120 Mpa to 128 Mpa.

2. The preparation method of the high-rate foamed PLA sheet according to claim 1, wherein the additive is nitrogen; and the nucleating agent is talcum powder.

3. The preparation method of the high-rate foamed PLA sheet according to claim 1, wherein the foamed sheet extrusion comprises: after a melt at an outlet of the first-stage extrusion has a pressure of 12 Mpa to 15 Mpa and a temperature of 190° C. to 200° C. and the melt at an outlet of the second-stage extrusion has a pressure of 3 MPa to 6 MPa and a temperature of 150° C. to 160° C., setting a screw speed of a first-stage screw extruder to 20 r/min to 50 r/min and setting a screw speed of a second-stage screw extruder to 10 r/min to 20 r/min to extrude a foamed sheet through a sheet die.

4. The preparation method of the high-rate foamed PLA sheet according to claim 3, wherein in the first-stage extrusion, a screw of the first-stage screw extruder has a diameter of 135 mm, a length-to-diameter ratio of 36:1, and an initial speed of 5 r/min to 15 r/min; and eleven temperature zones are set in sequence from a feeder to an extruder neck of the first-stage screw extruder, with a temperature range of 180° ° C. to 200° ° C.

5. The preparation method of the high-rate foamed PLA sheet according to claim 3, wherein in the second-stage extrusion, a screw of the second-stage screw extruder has a diameter of 150 mm, a length-to-diameter ratio of 36:1, and an initial speed of 5 r/min to 7 r/min; eight temperature control units are set in sequence from a melt entrance of the second-stage screw extruder first temperature control unit to a die head, with a temperature range of 150° C. to 170° ° C.; and a melt has a pressure of 4 MPa to 6 MPa.

6. The preparation method of the high-rate foamed PLA sheet according to claim 1, wherein the PLA is a modified foam-grade PLA raw material with a molecular weight of 120,000 to 150,000 and a PLA content of ≥97%.

7. The preparation method of the high-rate foamed PLA sheet according to claim 2, wherein the nitrogen is injected at a pressure of 10 MPa to 15 MPa and a purity of ≥99.9%; and the foaming agent is injected at a pressure of 16 MPa to 20 MPa.

8. The preparation method of the high-rate foamed PLA sheet according to claim 1, wherein an extrusion product is cooled and formed by a cool molding device, the extrusion product is split and flattened, the extrusion product is cooled and drawn by a drawing machine at a set drawing speed, and the extrusion product is shaped and wound by a winding machine to finally obtain the high-rate foamed PLA sheet.

9. The preparation method of the high-rate foamed PLA sheet according to claim 8, wherein the cool molding device is an anti-static cool molding sleeve, and a formed sheet is subjected to annular cooling using two cooling fans and to water-cooling in the anti-static cool molding sleeve; and the drawing machine is a roller drawing machine, with a drawing speed of 8 m/min to 12 m/min.

* * * * *